United States Patent [19]

Yamanaka et al.

[11] Patent Number: 4,736,219

[45] Date of Patent: Apr. 5, 1988

[54] CAMERA WITH A LENS COVER

[75] Inventors: Akira Yamanaka; Fumitaka Io, both of Osaka, Japan

[73] Assignee: Minolta Camera Kabushiki Kaisha, Japan

[21] Appl. No.: 899,116

[22] Filed: Aug. 22, 1986

[30] Foreign Application Priority Data

Aug. 23, 1985 [JP] Japan ............................ 60-129356[U]

[51] Int. Cl.$^4$ .............................................. G03B 17/02
[52] U.S. Cl. ...................... 354/288; 354/202; 354/293
[58] Field of Search ................ 354/202, 288, 82, 293, 354/187; 352/242, 243

[56] References Cited

U.S. PATENT DOCUMENTS

| | | | |
|---|---|---|---|
| 3,380,366 | 4/1968 | Olson | 352/243 |
| 4,240,735 | 12/1980 | Maitani et al. | 354/288 |
| 4,273,434 | 6/1981 | Maitani et al. | 354/288 |
| 4,299,465 | 11/1981 | Chan | 354/288 |
| 4,367,028 | 1/1983 | Tomatsuri et al. | 354/288 |
| 4,557,574 | 12/1985 | Kohno et al. | 354/288 |
| 4,589,747 | 5/1986 | Nakayama et al. | 354/288 |

FOREIGN PATENT DOCUMENTS

| | | | |
|---|---|---|---|
| 58-172637 | 10/1983 | Japan | 354/288 |
| 2136978A | 9/1984 | United Kingdom | 354/288 |

*Primary Examiner*—A. A. Mathews
*Attorney, Agent, or Firm*—Wolder, Gross & Yavner

[57] ABSTRACT

A camera having a lens cover is provided, at its one end portion, with a projecting portion which assists gripping of the camera. The lens cover is laterally slided to cover and uncover a front surface of an objective lens and is provided, on its front surface, with a recess to be engaged with fingers of a hand which grips the camera. The lens cover is operated by the fingers of the hand gripping the camera to move between an uncovering position where the lens cover is positioned adjacent to the projecting portion and a covering position where the lens cover is positioned apart from the projecting portion. The projecting portion in combination with a part of the lens cover located between an edge adjacent to the projecting portion and the recess constitutes a grip portion to be gripped for holding the camera.

5 Claims, 2 Drawing Sheets

CAMERA WITH A LENS COVER

BACKGROUND OF THE INVENTION

1. Field of the Invention

The present invention relates to a camera having a sliding lens cover on a front surface of a camera body, which lens cover is adapted to laterally move between a closed position and an open position to cover and uncover an objective lens, respectively.

2. Description of the Prior Art

Generally, a camera is gripped at right and/or left side portions with right and/or left hands to carry out a camera operation. On the other hand, a shutter release button is usually provided on an upper surface at a right upper portion so as to be depressed by a forefinger of a hand gripping the camera.

If a grip portion is to be provided on the lens cover sliding type camera as mentioned above, especially on the camera of such a type that the lens cover is moved to the shutter release button side to uncover the lens, it is required to be designed in consideration of the presence of the lens cover. That is to say, it becomes to design this type of camera in consideration of operability of opening and closing the lens cover as well as gripping function of the grip portion.

Conventionally, there has not been yet known a camera of this type designed in consideration of both the opening and closing operability of the lens cover and the gripping function of the grip portion while there is known a camera in which the shutter release button is provided on the upper surface at the right end portion as viewed by an operator (at the left side as viewed from the front of the camera), a finger engagement projection is formed on the front surface at the right-hand side of the lens cover, and a right end of the lens cover is movable to a substantially right end of the camera body in the open position. With a camera of this type, the operator must grip the camera, operates the lens cover and thereafter operates the shutter release button by the fingers of his right hand. However, as a first problem, the projection is easily caught by a case, bag or pocket when the camera is received therein. As a second problem, the projection is formed only for the purpose of engegemeht with a finger, and therefore it is so small in size for use as a right-hand grip member of the camera body, and does not satisfy a gripping function. As a third problem, when the lens cover is moved to the open position, the projection excessively approaches to the right end of the camera body, and therefore the opening and closing operation of the lens cover is hardly carried out by flexing and stretching the right-hand fingers with the grip portion of the camera gripped by the right hand.

SUMMARY OF THE INVENTION

An object of the present invention is to provide a camera that can be easily gripped and includes a lens cover that can be easily operated.

In order to achieve the aforementioned object, a camera of the present invention is provided with a first and a second grip portion that constitute a single grip portion and a lens cover arranged on a camera body so as to slide laterally between a close position apart from the first grip portion and an open position close to the first grip portion. The lens cover provides a recess on its front surface. The first grip portion is formed at one lateral end portion of the camera body and projecting forwardly from a front surface of the camera body.

The second grip portion is formed on the front surface of the lens cover between the recess and a lateral side edge facing the first grip portion.

The recess can receive finger tips of a hand gripping the grip portion when the lens cover is in the open position.

When the grip portion of the camera body is gripped by a hand, the finger tips of the hand are just received with the recess. Accordingly, the fingers are flexed and stretched under the gripped condition to easily slide the lens cover between the open and the close positions, thus improving the opening and closing operability of the lens cover and gripping function of the grip portion.

Further, since the recess is recessed from the front surface of the lens cover, there is no possibility that the recess is cauthgt by a case, bag or pocket when the camera is received therein.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
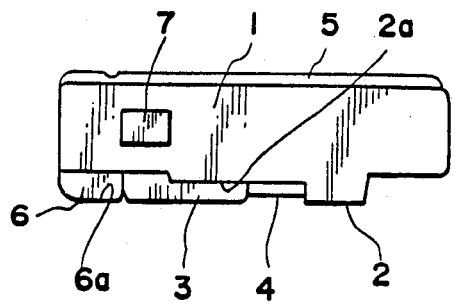
FIGS. 1 and 2 are plan and front elevational views of the camera of a preferred embodiment according to the present invention, respectively, under the open position of the lens cover.

Referring to the drawings, a camera body 1 is provided with a slide-type lens cover 3 on a front side thereof. The lens cover 3 is adapted to be moved laterally between an open position shown in FIGS. 1, 2 and 4 and a closed position shown in FIGS. 3 and 5 to thereby cover and uncover an objective lens 4 and a viewfinder 8 provided at a substantially central position on the front side of the camera body 1.

As is conventional, the camera body 1 is constituted by a housing 2 a rear cover 5 rotatably mounted to a rear end of the housing 2 and a battery case 6 mounted to the left end portion of the housing 2. The housing 2 involves the lens 4 and the viewfinder 8 at the central position on the front side, a shutter release button 7 at a left end portion as viewed from the side opposite to the front side of the camera body (namely, at a right end portion as viewed by an operator), and a flash 9 at a right end portion.

The battery case 6 is designed to receive a pair of cylindrical batteries 6b. A front surface 6a of the battery case 6 is forwardly projected from a lens cover slide surface 2a of the housing 2 to form a first part of a grip portion to be gripped by an operator's right hand and a stopper portion for restricting the open position of the lens cover 3 as shown in FIG. 4.

The lens cover 3 is formed on its front surface with a vertical finger groove 3a extending along a vertical edge 3b at the left end portion. A portion 3c of the lens cover 3 on the battery case side of the vertical finger groove 3a forms a second part of the grip portion in cooperation with the projecting front surface 6a of the battery case 6. As shown in FIG. 4, when the lens cover 3 is in the open position, and the grip portion is gripped by the operator's right hand, fingers of the right hand are just received in the vertical groove 3a. Accordingly, the camera may be easily held by gripping the grip portion. Thus, a gripping function of the grip portion may be improved.

Figure 4:
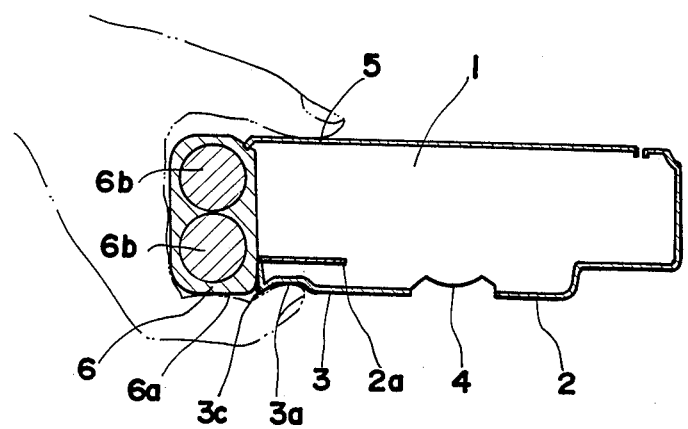
FIG. 4 is an enlarged sectional view taken along the line IV—IV in FIG. 2 (internal mechanism is omitted)
Figure 5:
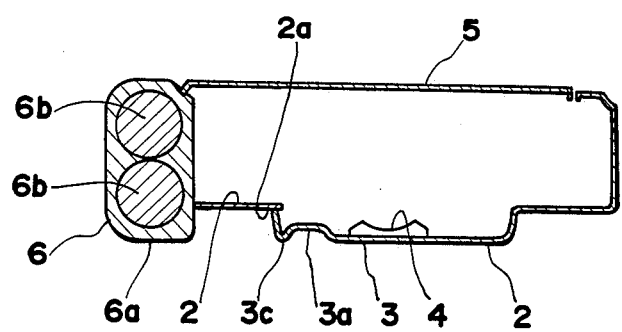
FIG. 5 is an enlarged sectional view taken along the line V—V in FIG. 3 (internal mechanism is omitted).

Further, in the camera according to the present invention, the lens cover 3 may be opened and closed by primarily flexing and stretching the fingers of the right hand gripping the grip portion as shown in FIG. 4. Accordingly, an opening and closing operation may be easily carried out.

Figure 2:
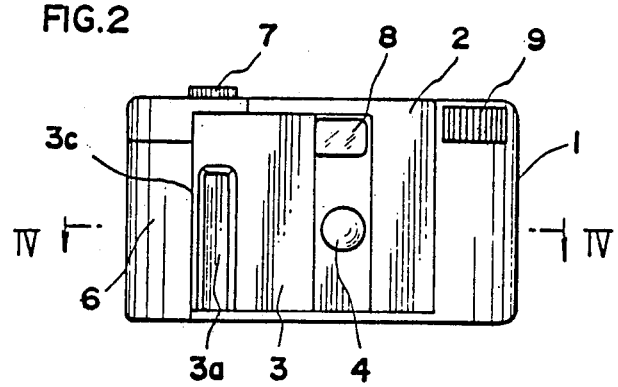
Figure 3:
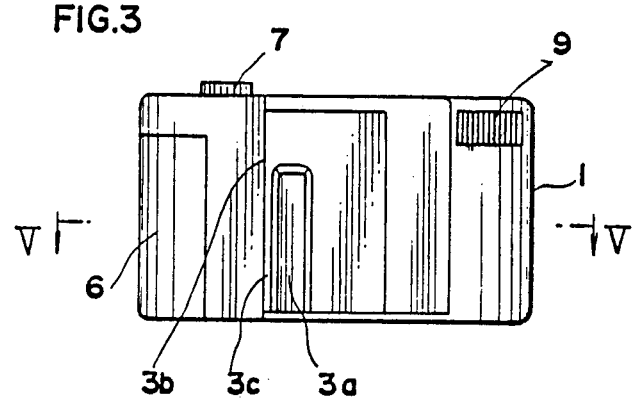
FIG. 3 is a front elevational view of the camera under the closed position of the lens cover.

Moreover, the projecting front surface 6a of the battery case 6 is flush with the front surface of the lens cover 3. Accordingly, when the lens cover 3 is in the open position as shown in FIGS. 1, 2 and 4, the lens cover 3 and the battery case 6 appear to be integral, which may remarkably contribute to improvement in design.

Although the finger groove 3a is vertically extended in the aforementioned preferred embodiment, it may be inclined to some extent, or it may be replaced with a curved groove or any other grooves having various shapes rather than a straight groove. Further, the groove may be separated into at least two parts rather than a single groove.

Furthermore, the part of the grip portion formed by the battery case 6 may be used to incorporate any other electric elements such as a capacitor or other mechanism rather than a battery, but rational arrangement may be conveniently obtained by forming the part of the grip portion by the battery case as mentioned above since the battery case for receiving the battery for powering the flash and the shutter, etc. is frequently incorporated in the camera body in recent years.

When the front surface of the part of the grip portion formed by the battery case 6 is flush with the lens cover as in the above described embodiment, the lens cover appears integral with the camera body upon opening the lens cover, thereby making a design very simple. However, the front surface of the part of the grip member is not necessarily limited to be flush with the lens cover. In the case that the camera body is sufficiently small in respect of a length of fingers, for instance, a lateral end portion of the part of the grip portion may be projected to the front side more than the opposite end portion, so as for the fingers to sufficiently abut against the front surface of the projected portion.

What is claimed is:

1. A camera comprising:
   a camera body provided with an objective lens located on the front surface thereof;
   a first grip portion formed at a lateral end portion of said camera body, and projecting forwardly from said front surface of said camera body;
   a lens cover arranged on said camera body so as to slide in a lateral direction along said front surface of said camera body between a closed position apart from said first grip portion for covering said objective lens and an open position adjacent to said first grip portion for uncovering said objective lens, said lens cover including a recess on the front surface thereof; and
   a second grip portion formed by the portion of the front surface of said lens cover between said recess and a lateral side edge facing said first grip portion, so that said first and second grip portions form a unified grip in cooperation with one another and so that said recess can receive finger tips of a hand gripping said unified grip when said lens cover is in said open position.

2. A camera as set forth in claim 1, further comprising a shutter release button on an upper surface of said camera body, wherein said lateral end portion where said first grip portion is formed is close to said shutter release button.

3. A camera as set forth in claim 1, wherein said first grip portion comprises a battery case for receiving a battery therein.

4. A camera as set forth in claim 1, wherein the front surfaces of said first and second grip portions are flush with one another.

5. A camera as set forth in claim 1, wherein said closed position is located such that said recess can receive finger tips of a hand gripping said unified grip to slide said lens cover to said open position.

* * * * *